(12) United States Patent
Varteresian et al.

(10) Patent No.: US 12,204,669 B2
(45) Date of Patent: Jan. 21, 2025

(54) EXTENDING PRIVATE CLOUD SECURITY MODEL TO PUBLIC CLOUD

(71) Applicant: Dell Products L.P., Round Rock, TX (US)

(72) Inventors: Michael G. Varteresian, Lexington, MA (US); Muzhar S. Khokhar, Shrewsbury, MA (US); Wenfeng Li, Shanghai (CN); Donald Mace, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 362 days.

(21) Appl. No.: 17/584,996

(22) Filed: Jan. 26, 2022

(65) Prior Publication Data
US 2023/0237181 A1 Jul. 27, 2023

(51) Int. Cl.
*G06F 21/62* (2013.01)
*G06F 16/25* (2019.01)

(52) U.S. Cl.
CPC ........ *G06F 21/6218* (2013.01); *G06F 16/258* (2019.01); *G06F 2221/2141* (2013.01)

(58) Field of Classification Search
CPC .............. G06F 21/6218; G06F 16/258; G06F 2221/2141
See application file for complete search history.

(56) References Cited

U.S. PATENT DOCUMENTS

| | | | | |
|---|---|---|---|---|
| 8,813,174 B1 * | 8/2014 | Koeten | .................. | H04L 67/10 |
| | | | | 713/168 |
| 11,445,009 B1 * | 9/2022 | Ji | ...................... | H04L 63/0428 |
| 12,101,320 B2 * | 9/2024 | Khokhar | .............. | H04L 63/102 |
| 2012/0101995 A1 * | 4/2012 | Agetsuma | .............. | G06F 16/10 |
| | | | | 707/E17.044 |
| 2013/0007845 A1 * | 1/2013 | Chang | .................. | H04L 63/104 |
| | | | | 726/4 |
| 2016/0012182 A1 * | 1/2016 | Golay | .................... | G16H 40/20 |
| | | | | 705/3 |
| 2017/0163644 A1 * | 6/2017 | Horii | ...................... | H04L 63/10 |

(Continued)

FOREIGN PATENT DOCUMENTS

| | | | | |
|---|---|---|---|---|
| CN | 112424818 A * | 2/2021 | ............ | G06F 9/5011 |
| EP | 3765985 B1 * | 7/2022 | ............ | G06F 21/554 |
| WO | WO-2021137138 A1 * | 7/2021 | ............ | G06F 18/231 |

*Primary Examiner* — John B King
(74) *Attorney, Agent, or Firm* — Jackson Walker L.L.P.

(57) ABSTRACT

Methods and systems disclosed herein extend an entity's private cloud security model to the entity's public cloud. Public cloud access permissions are defined, in accordance with a security model implemented in the entity's private cloud, for one or more of the entity's public cloud resources. The public cloud permissions are pushed or otherwise provided to an access module within the private cloud. Upon receiving a request to access a public cloud resource, the private cloud access module is invoked to grant or deny the access request in accordance with the public cloud access permissions. Similarly, upon receiving a request to access a private cloud resource, the private cloud access module is invoked to process the access request in accordance with private cloud access permissions, thereby beneficially enabling users to interact with a single access interface regardless of whether the resource reside within the entity's cloud platform.

9 Claims, 2 Drawing Sheets

(56) References Cited

U.S. PATENT DOCUMENTS

| | | | |
|---|---|---|---|
| 2018/0026985 A1* | 1/2018 | Pogrebinsky | H04L 67/1095 726/7 |
| 2018/0027050 A1* | 1/2018 | Pogrebinsky | H04L 63/10 709/223 |
| 2019/0213104 A1* | 7/2019 | Qadri | H04L 67/1097 |
| 2022/0141189 A1* | 5/2022 | Flavel | H04L 63/0272 726/15 |
| 2023/0239298 A1* | 7/2023 | Khokhar | H04L 63/102 726/4 |

* cited by examiner

EXTENDING PRIVATE CLOUD SECURITY MODEL TO PUBLIC CLOUD

TECHNICAL FIELD

The present disclosure relates to cloud computing and, more specifically, managing access to public and private cloud resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured to provide a cloud computing platform, sometimes referred to simply as a cloud or the cloud, that provides on-demand access to virtualized information handling resources, including compute, storage, and network resources, abstracted from a common pool of hardware assets. In at least some contexts, the term private cloud may refer to cloud resources dedicated to or otherwise associated with a single entity, sometimes referred to herein as a customer. Private clouds may be managed internally or by a third party and may be hosted either on-premises or externally. In at least some contexts, the term public cloud may refer to a cloud resources maintained by a third party provider and accessible to authorized users via the Internet or another public network as a paid or unpaid subscription. A hybrid cloud, as suggested by its name, may refer to cloud infrastructure that includes both a public cloud and a private cloud, typically linked together with a secure connection.

In hybrid cloud environments, application portals may provide the customer with access to both public and private cloud resources. A customer's hybrid cloud platform may include a customer-developed application offered via public cloud resources and a private cloud built on 3rd party software such as VMWare. While a common security model and a single security domain for both clouds might reduce overall cost and provide a common management experience, security control for cloud-based applications is often implemented by integrating standard third-party libraries or building customized security models from scratch. These approaches may not only require a considerable commitment of time and resources, but may also result in non-consistent security models and domains.

SUMMARY

In accordance with teachings disclosed herein, common problems associated with separate and distinct security models for an entity's public and private clouds are addressed by methods and systems disclosed herein for extending the security model employed within the private cloud to encompass access to the entity's public cloud resources as well. Methods and systems disclosed herein define public cloud access permissions for one or more of the entity's public cloud resources. The public cloud access permissions are defined in accordance with a security model implemented in the entity's private cloud. The public cloud permissions are pushed from the public cloud or otherwise provided to an access module within the private cloud. Upon receiving an access request to access a public cloud resource, the private cloud access module is invoked to process and either grant or deny the access request in accordance with the public cloud access permissions. Upon receiving an access request to access a private cloud resource, the private cloud access module is invoked to process the access request in accordance with private cloud access permissions. In this manner, users interact with a single access interface regardless of whether the resource of interest resides in the public or private cloud. In addition, by leveraging the security model of the private cloud, disclosed methods beneficially reduce or eliminate the need to develop a separate and distinct security model for the public cloud.

In some embodiment, providing the public cloud to the private cloud is achieved by pushing the private cloud access permissions from the public cloud to the private cloud access module. Disclosed methods and systems may employ a central management feature in which the private and public cloud access permissions are both managed within the private cloud to provide users with a uniform access security interface. In such embodiments, whenever an instanced of managing a public cloud access permission is completed, the public cloud access permission may be forwarded via a secure channel to the private cloud.

In at least some embodiments, the private cloud security model is a role-based access model in which each access permission is associated with one resource or object. The access permission may indicate one or more authorized users to which the permission pertains and identify a role accorded to the one or more authorized users with respect to the resource. In some such security models, each role includes one or more fine-grained access privileges that the authorized user or users enjoy with respect to the applicable resource.

Although this disclosure illustrates and describes hybrid cloud implementations, disclosed teachings may be readily employed within multi-cloud platforms as well. In addition, although this disclosure illustrates and describes implementations in which private cloud security models are extended to public cloud resources, disclosed teachings may be readily extended to encompass implementations in which a public cloud access model is extended to the private cloud.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
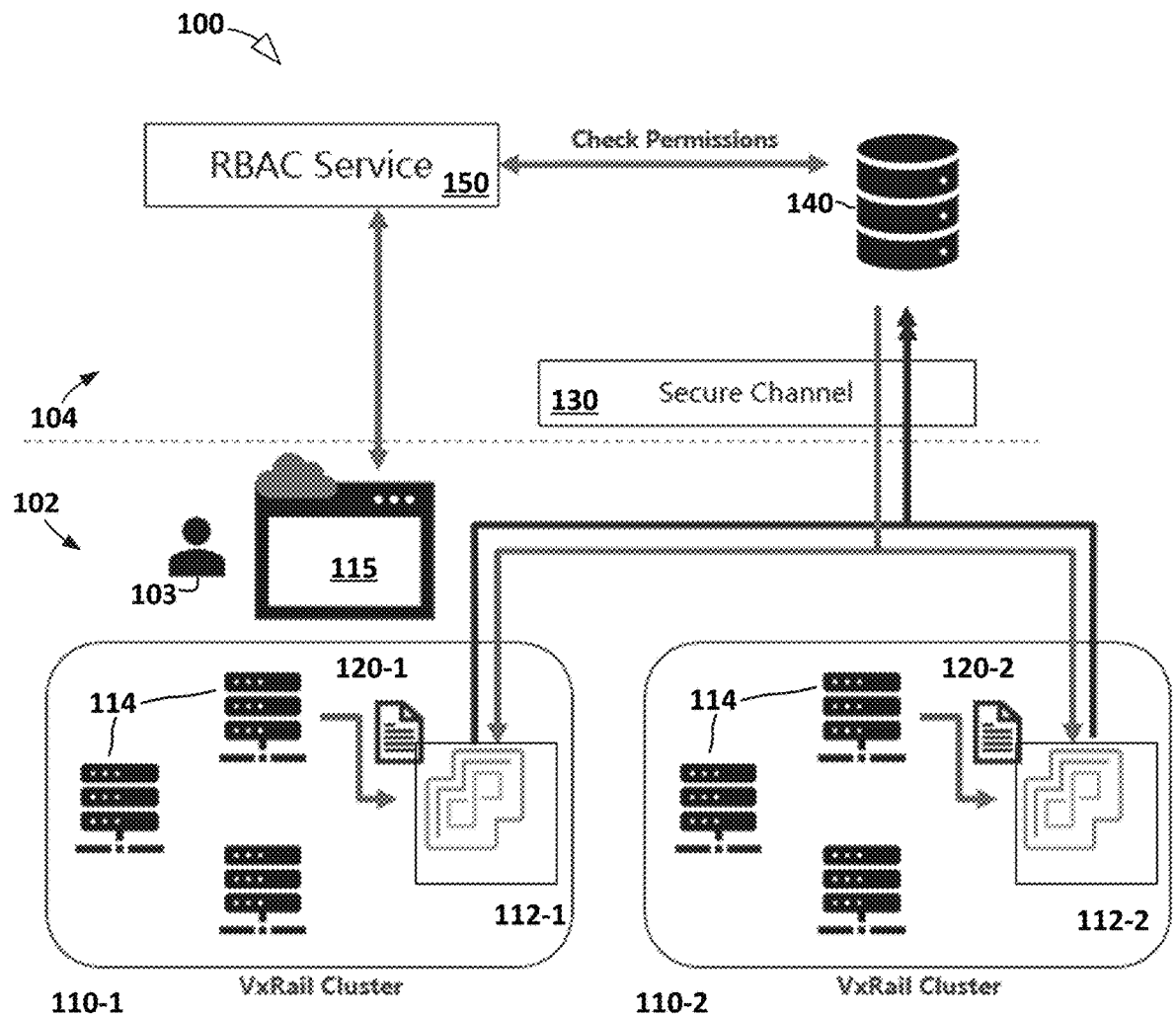
FIG. 1 illustrates a cloud platform, including a private cloud and a public cloud, in accordance with disclosed teachings of a uniform access feature.
Figure 2:
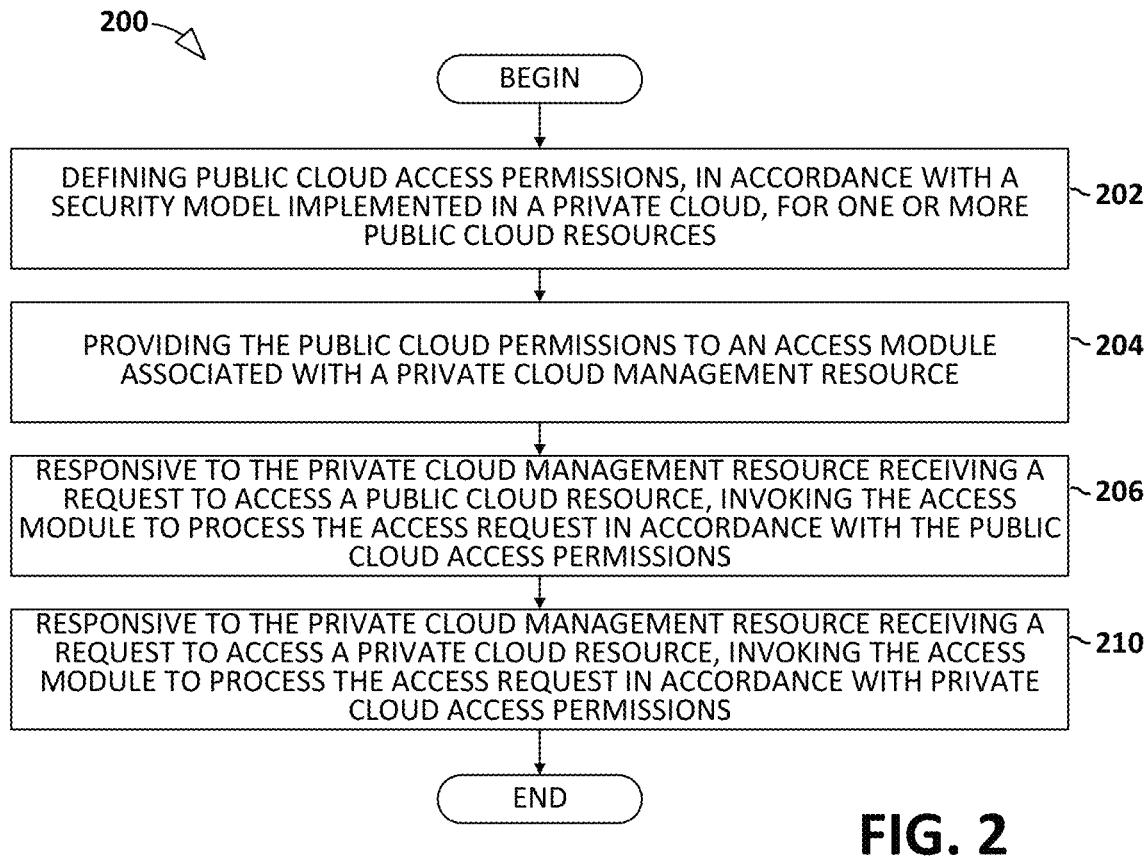
FIG. 2 illustrates a flow diagram of a disclosed method for extending a private cloud security model to public cloud assets.
Figure 3:
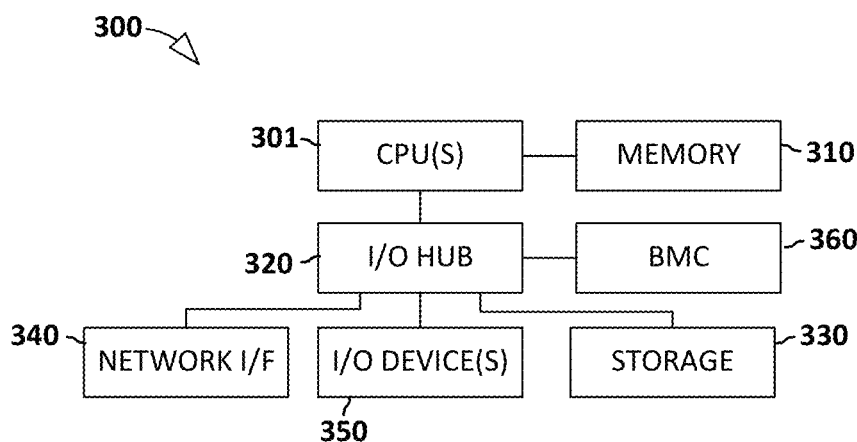
FIG. 3 illustrates an information handling system suitable for use in conjunction with method and systems disclosed in FIG. 1 and FIG. 2.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 an exemplary hybrid cloud 100 in accordance with disclosed teachings for security model and access control management is illustrated.

A customer's existing private network or on-premises security model is leveraged and adopted in the customer's public cloud application. In some embodiments, a plugin for the on-premises network management resource augments the on-premises security model to support additional access permissions for use by the public cloud application. This adaptation beneficially enables the customer to perform all platform management for public as well as private cloud resources with a private network management resource portal serving as the user's single cloud management source and window. A collection agent may be configured to collect on-premises security permissions and synchronize the permissions up to the public could application using a secure channel. With such features, the customer simply needs to set required security permissions in the private network management resource, thereby rendering the customer's platform somewhat less hybrid in an area where uniformity is generally desirable and more efficient.

FIG. 1 illustrates hybrid cloud platform 100 including on-premises resources 102, alternatively referred to herein as private network resources, and public cloud resources 104, alternatively referred to herein as off-premises resources. The on-premises resources 102 illustrated in FIG.

1 include one or more hyper-converged infrastructure (HCI) clusters 110, including a first HCI cluster 110-1 and a second HCI cluster 110-2 illustrated in FIG. 1. Each HCI cluster 110 illustrated in FIG. 1 is a multi-node cluster that includes two or more nodes 114, each of which supports tightly integrated and easily managed virtualized and/or containerized compute, storage, and networking resources. A commercially distributed example of an HCI device suitable to support the clusters 110 of FIG. 1 is any of the VxRail family of HCI appliances from Dell Technologies.

Each HCI cluster 110 illustrated in FIG. 1 includes a corresponding collection agent 112. The illustrated collection agent 112 may be configured to collect security permission information 120 from a private network management resource, such as a VMware vCenter Server from Dell Technologies, and synchronize the security data, including access permissions, to the customer's public cloud Application database 140 via a secure channel 130.

FIG. 1 further illustrates a role based access control (RBAC) service 150 configured to extend the private network security model to public cloud 104. FIG. 1 depicts a user 103 within private network 102 accessing a cloud-based resource 115, e.g., a web page. The RBAC service 150 is configured to detect the access request from user 103, retrieve access permissions from public cloud application database 140, and grant or deny the access request in accordance with the on-premises access control model.

In at least one embodiment, the public cloud resources 104 may extend new security permissions including permissions for public cloud resources and usage. The customer manages the security permission centrally in the private network management resource (not explicitly depicted in FIG. 1. After permissions are set in the private network management resource the cloud platform receives permission changes that apply to both public cloud 104 and private on-premises resources 102.

Referring now to FIG. 2, a method for extending private cloud security models and/or access permissions to public cloud resources is illustrated in flow diagram format. The method 200 illustrated in FIG. 2 defines (block 202) public cloud access permissions for one or more public cloud resources associated with a customer, wherein the public cloud access permissions are formatted and are otherwise structured in compliance with a security model implemented in the customer's private cloud. The public cloud access permissions are provided (block 204) to an access module associated with a private cloud management resource such as the customer's vCenter Server software. Whenever a request to access a public cloud resource is received via a portal of the private cloud management resource, the access module is invoked (block 206) to process the access request in accordance with the public cloud access permissions. Similarly, whenever a request to access a private cloud resource is received via a portal of the private cloud management resource, the access module is invoked (block 210) to process the access request in accordance with the public cloud access permissions. Responsive to the private cloud management resource receiving a request to access a private cloud resource, invoking (block 210). In this manner, the illustrated method 200 extends the customer's well developed private cloud security model and access permissions to at least some of the customer's public cloud resources, thereby facilitating a more uniform perception of the customer's hybrid cloud platform.

Referring now to FIG. 3, any one or more of the elements illustrated in FIG. 1 through FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing access security in a cloud environment, wherein the method comprises:
    defining public cloud access permissions for one or more public cloud resources associated with an entity, wherein the public cloud access permissions are in accordance with a security model implemented in a private cloud of the entity;
    providing the public cloud permissions to a private cloud access module;
    responsive to an access request to access a public cloud resource, invoking the private cloud access module to process the access request in accordance with the public cloud access permissions;

responsive to an access request to access a private cloud resource, invoking the private cloud access module to process the access request in accordance with private cloud access permissions;

managing the private cloud access permissions and the public cloud access permissions from within the private cloud; and responsive to managing a public cloud access permission from within the private cloud, forwarding the public cloud access permission to the public cloud via a secure channel between the private cloud and public cloud.

2. The method of claim 1, wherein providing the public cloud permissions comprises pushing the public cloud access permissions from the public cloud to the private cloud access module.

3. The method of claim 1, wherein the private cloud security model comprises a role-based access model wherein an access permission is associated with a resource, indicates one or more authorized users to which the permission pertains, and identifies a role, comprising one or more access privileges, accorded to the one or more authorized users with respect to the resource.

4. An information handling system, comprising:
a central processing unit (CPU); and
a computer readable memory, accessible to the CPU, including process executable program instructions that, when executed by the CPU, cause the CPU to perform operations for managing access security in a cloud environment, wherein the operations include:
defining public cloud access permissions for one or more public cloud resources associated with an entity, wherein the public cloud access permissions are in accordance with a security model implemented in a private cloud of the entity;
providing the public cloud permissions to a private cloud access module;
responsive to an access request to access a public cloud resource, invoking the private cloud access module to process the access request in accordance with the public cloud access permissions;
responsive to an access request to access a private cloud resource, invoking the private cloud access module to process the access request in accordance with private cloud access permissions;
managing the private cloud access permissions and the public cloud access permissions from within the private cloud; and
responsive to managing a public cloud access permission from within the private cloud, forwarding the public cloud access permission to the public cloud via a secure channel between the private cloud and public cloud.

5. The information handling system of claim 4, wherein providing the public cloud permissions comprises pushing the public cloud access permissions from the public cloud to the private cloud access module.

6. The information handling system of claim 4, wherein the private cloud security model comprises a role-based access model wherein an access permission is associated with a resource, indicates one or more authorized users to which the permission pertains, and identifies a role, comprising one or more access privileges, accorded to the one or more authorized users with respect to the resource.

7. A non-transitory computer readable memory including process executable program instructions that, when executed by a processor of an information handing system, cause the system to perform operations for managing access security in a cloud environment, wherein the operations include:
defining public cloud access permissions for one or more public cloud resources associated with an entity, wherein the public cloud access permissions are in accordance with a security model implemented in a private cloud of the entity;
providing the public cloud permissions to a private cloud access module;
responsive to an access request to access a public cloud resource, invoking the private cloud access module to process the access request in accordance with the public cloud access permissions;
managing the private cloud access permissions and the public cloud access permissions from within the private cloud; and
responsive to managing a public cloud access permission from within the private cloud, forwarding the public cloud access permission to the public cloud via a secure channel between the private cloud and public cloud.

8. The non-transitory computer readable medium of claim 7, wherein providing the public cloud permissions comprises pushing the public cloud access permissions from the public cloud to the private cloud access module.

9. The non-transitory computer readable medium of claim 7, wherein the private cloud security model comprises a role-based access model wherein an access permission is associated with a resource, indicates one or more authorized users to which the permission pertains, and identifies a role, comprising one or more access privileges, accorded to the one or more authorized users with respect to the resource.

* * * * *